United States Patent
Yi et al.

(10) Patent No.: US 7,453,833 B2
(45) Date of Patent: Nov. 18, 2008

(54) HYBRID-TYPE DATA TRANSMISSION APPARATUS AND METHOD SUITABLE FOR HIGH-PERFORMANCE WIRELESS LAN

(75) Inventors: Doo-youll Yi, Yongin-shi (KR); Kyung-wan Nam, Sungnam-shi (KR)

(73) Assignee: Samsung Electronics Co., Ltd. (KR)

( * ) Notice: Subject to any disclaimer, the term of this patent is extended or adjusted under 35 U.S.C. 154(b) by 834 days.

(21) Appl. No.: 10/787,671

(22) Filed: Feb. 26, 2004

(65) Prior Publication Data

US 2004/0174831 A1 Sep. 9, 2004

(30) Foreign Application Priority Data

Feb. 26, 2003 (KR) .................. 10-2003-0012069

(51) Int. Cl.
*H04B 7/005* (2006.01)
(52) U.S. Cl. .................................... 370/278
(58) Field of Classification Search ............. 370/278, 370/282, 338, 463, 468, 457, 235, 236, 294; 375/370; 709/238
See application file for complete search history.

(56) References Cited

U.S. PATENT DOCUMENTS

| | | | |
|---|---|---|---|
| 4,509,164 A * | 4/1985 | Mouftah | 370/294 |
| 2002/0107979 A1 * | 8/2002 | Sarnikowski et al. | 709/238 |
| 2004/0120292 A1 * | 6/2004 | Trainin | 370/338 |
| 2006/0128318 A1 * | 6/2006 | Agarossi et al. | 455/69 |

FOREIGN PATENT DOCUMENTS

KR 1998-026617 7/1998

* cited by examiner

*Primary Examiner*—Chirag G Shah
*Assistant Examiner*—Yong Zhou
(74) *Attorney, Agent, or Firm*—Mills & Onello LLP

(57) ABSTRACT

In a method and apparatus for data transmission suitable for a high-performance wireless LAN, the apparatus utilizes a serial communication interface device to perform data transmission between a master and a slave. The data transmission apparatus includes a data input unit for receiving at least one of transmission rate data and transmission length data to be transmitted from the master to the slave. A selection unit receives the at least one of the transmission rate data and the transmission length data from the data input unit, and receives at least one of a corresponding first event signal and a second event signal for selectively transmitting at least one of the transmission rate data and the transmission length data respectively to the slave. A controller receives the at least one of the transmission rate data and the transmission length data from the selection unit and controls a serial communication interface used to transmit the at least one of the transmission rate data and the transmission length data to the slave. A control unit automatically controls critical timing of the transmission of the at least one of the transmission rate data and the transmission length data, in response to activation of the corresponding at least one first event signal and second event signal.

20 Claims, 6 Drawing Sheets

HYBRID-TYPE DATA TRANSMISSION APPARATUS AND METHOD SUITABLE FOR HIGH-PERFORMANCE WIRELESS LAN

BACKGROUND OF THE INVENTION

1. Field of the Invention

The present invention relates to a communication interface device and method, and, more particularly, to a hybrid-type data transmission apparatus and method suitable for a wireless local area network (LAN). Further, the present invention relates to a serial peripheral interface (SPI), and more particularly, to a hybrid-type serial peripheral interface device for controlling critical timing at the time of data transmission in a wireless LAN, and a data processing method thereof.

2. Description of the Related Art

A media access controller (MAC) and a baseband processor (BBP) generally include a serial peripheral interface (SPI) for a mutual data transmission. Such an interface employs handshaking as a way of transmitting and receiving signals such as an information request, a transmission check, a reception check, and the like. to perform the mutual data transmission.

The serial peripheral interface (SPI) is a communication protocol adapted for use in an electronic device requiring low-performance control using synchronous serial communication. Further, since the serial peripheral interface (SPI) is used in the low-performance communication channel, the electronic device commonly uses software as a mechanism for controlling the interface.

However, in the event that communication is performed using the serial peripheral interface (SPI) between systems requiring a high-performance communication channel, such as in the case of wireless LAN, since the conventional communication device operates under the control of software, an inexact adjustment of the critical timing between frames results at the time of data transmission. As a result, such communication is inefficient and is prone to errors.

SUMMARY OF THE INVENTION

Accordingly, the present invention is directed to a serial data transmission apparatus and method adaptive to a high-performance wireless LAN system that substantially obviates one or more of the limitations and disadvantages of the conventional approaches.

It is an object of the present invention to provide a serial data transmission apparatus adaptive to a high-performance wireless LAN.

It is another object of the present invention to provide a data transmission method in a serial data transmission apparatus adaptive to a high-performance wireless LAN.

It is further another object of the present invention to provide a media access controller having a serial peripheral interface circuit adaptive to a high-performance wireless LAN, and a control method thereof.

In one aspect of the present invention, there is provided a data transmission apparatus that utilizes a serial communication interface device to perform data transmission between a master and a slave. The data transmission apparatus includes a data input unit for receiving at least one of transmission rate data and transmission length data to be transmitted from the master to the slave. A selection unit receives the at least one of the transmission rate data and the transmission length data from the data input unit, and receives at least one of a corresponding first event signal and a second event signal for selectively transmitting at least one of the transmission rate data and the transmission length data respectively to the slave. A controller receives the at least one of the transmission rate data and the transmission length data from the selection unit and controls a serial communication interface used to transmit the at least one of the transmission rate data and the transmission length data to the slave. A control unit automatically controls critical timing of the transmission of the at least one of the transmission rate data and the transmission length data, in response to activation of the corresponding at least one first event signal and second event signal.

The control unit may automatically control critical timing of the transmission during a time period in which the slave is undergoing a warm-up procedure.

The data input unit comprises, for example, a first data input unit for receiving the transmission rate data; and a second data input unit for receiving the transmission length data. The first and second data input units are controlled by the control unit to transmit the at least one transmission rate data and transmission length data to the selection unit in response to the corresponding at least one first and second event signals. The selection unit comprises, for example, a multiplexer.

The controller comprises, for example, a control register having a plurality of flags for setting information for a serial communication interface. A timer, in the case where the transmission rate data and the transmission length data are to be consecutively transmitted, sets a time duration between the transmission rate data and the transmission length data such that a linked operation is made with the slave under control of the control unit. A data converter converts the transmission length data to slave-compatible transmission length under the control of the control unit.

The data converter optionally converts a data quantity to a time unit of data.

The first and second event signals may be generated by a firmware stored in an external memory. When data is received from the slave, the first and second event signals indicate whether the firmware requires transmission of a response frame for a frame transmitted from a header of the frame, or requires generation of a frame according to a firmware user's request.

In the case where the transmission rate data and the transmission length data are to be consecutively transmitted, the control unit operates to transmit the transmission rate data during transmission of a frame of transmission data. When the transmission rate data is transmitted during transmission of the frame of the transmission data, the control unit operates to set the transmission rate data at the same transmission rate as that of a previously transmitted frame.

The control unit is comprised, for example, of a finite state machine. The control unit performs a control function comprised of: a first control state in which, if both of the first and second event signals are generated, the transmission rate data and the transmission length data are controlled to be consecutively transmitted to the slave; and a second and third control states in which, if one of the first and second event signals is generated, then a corresponding one of the transmission rate data and the transmission length data is controlled to be transmitted to the slave. When in the first control state, in the case where the transmission rate data and the transmission length data are consecutively transmitted, a selection signal of the slave is activated for a time duration data such that a linked operation is made with the slave. When in the third control state, when the transmission length data is transmitted, the transmission length data is converted from a byte unit to a microsecond unit of data. The control unit may further include software for polling for completion of the transmission of frame transmission data for controlling the critical timing.

The data transmission apparatus may be provided in an electronic device for a wireless LAN.

In another aspect, the present invention is directed to a serial data transmission method for transmitting data from a master to a slave. It is determined whether a need exists for transmission of at least one of a transmission rate data and a transmission length data for a data frame to be transmitted from the master to the slave. At least one of a corresponding first event signal and a second event signal are generated to respectively transmit the transmission rate data and the transmission length data. The transmission rate data are transmitted to the slave during the transmission of the data frame in response to the first event signal. The transmission length data are converted to a format suitable for the slave. The converted transmission length data are transmitted to the slave during a time period between the data frame and a next data frame, in response to the second event signal.

In one embodiment, the slave undergoes a warm-up procedure during the time period between the data frame and the next data frame.

Accordingly, if the hybrid-type serial data transmission apparatus of the present invention receives, while in a standby state under software control, at least one event signal for writing the transmission rate data and the transmission length data of the transmission data to the baseband processor using the wireless LAN firmware. Upon receipt of the at least one event signal, the data transmission apparatus configures itself to operate under automatic hardware control under an operation sequence of a finite state machine. At this time, when the transmission rate data and the transmission length data are transmitted, they are separated from each other, and the transmission rate data uses a set-ahead function in that it is transmitted during transmission of the data frame.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Reference will now be made in detail to the preferred embodiments of the present invention, examples of which are illustrated in the accompanying drawings. However, the present invention is not limited to the embodiments illustrated herein after, and the embodiments herein are rather introduced to provide a complete understanding of the scope and spirit of the present invention.

Figure 1:
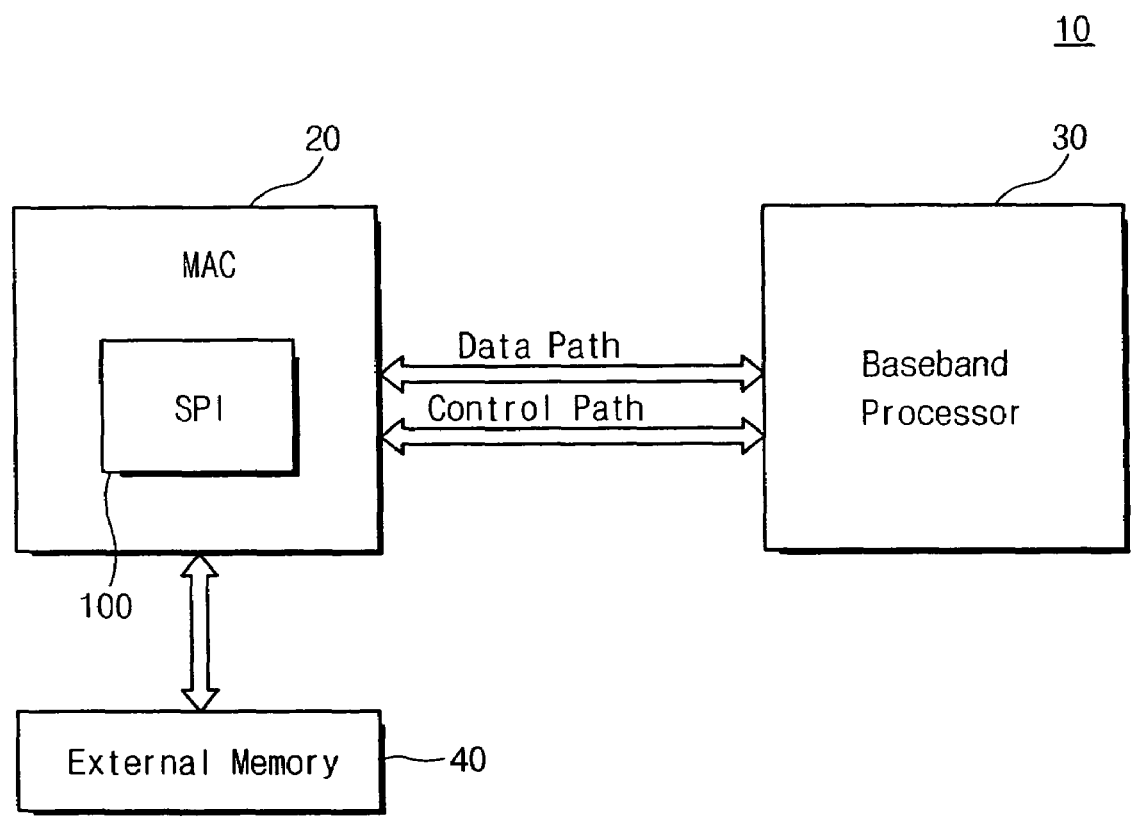
FIG. 1 is a schematic block diagram illustrating a partial construction of a wireless LAN electronic device according to a preferred embodiment of the present invention.

FIG. 1 is a schematic block diagram illustrating a partial construction of a wireless LAN electronic device according to a preferred embodiment of the present invention.

Referring to the drawing, the electronic device 10 includes a media access controller (MAC) 20, a baseband processor (BBP) 30 and an external memory 40. The electronic device performs data communication using a high-performance wireless LAN protocol, and is exemplified as a mobile device such as a Personal Digital Assistant (PDA), etc., and a box-type application, etc. such as a wireless LAN network card or an externally mounted modem, and the like.

The media access controller (MAC) 20 is a device adaptive to the wireless LAN data communication, and includes a new serial peripheral interface (SPI) circuit 100.

The baseband processor (BBP) 30 is, for example, provided between an RF/IF transceiver (not shown) and the media access controller 20 of the electronic device 10 to modulate/demodulate and transmit/receive transmission and reception data therefrom.

Additionally, external memory 40 is provided outside of the media access controller (MAC) 20, and stores software such as a firmware, an operating system (OS) and an application program, etc. depending on a usage of the electronic device 10.

Accordingly, the media access controller (MAC) 20 includes a data path (Data Path) and a control signal path (Control Path) for a mutual transmission of data and control signals with the baseband processor (BBP) 30 in the case of the wireless LAN. Additionally, the media access controller (MAC) 20 receives data stored in the external memory 40 and the control signals to perform a control operation corresponding to a process sequence of the firmware, the operating system (OS) and/or the application program, etc.

The data path is a data transmission path between the media access controller (MAC) 20 and the baseband processor (BBP) 30, and is apportioned in a bit-serial manner or a byte-parallel manner, etc. according to the quantity of data transmission. The control path is a transmission path that allows for the reading and writing of the contents of a register (not shown) provided in the baseband processor (BBP) 30, and uses a serial peripheral interface (SPI) or an ISDN Originated Modular Interface (IOM-2 interface) or a memory controller interface, etc. However, information transmitted through the control path is generally information for checking the current state of a register or for initialization of the register. Information that is to be transmitted along the control path depends on the need in a given data transmission. Such information is exemplified as the transmission rate data (TX Rate) of a frame to be transmitted, the transmission length data (TX Length) of transmission data, and the like.

The serial peripheral interface (SPI) circuit 100 is a hybrid-type interface device for processing the data transmission under software control and under automatic hardware control way. The SPI circuit 100 performs a control function under automatic hardware control in order to precisely control the critical timing between the frames transmitted, for example transmitted in the case of the wireless LAN.

Since frame transmission in the case of wireless LAN has a poor channel characteristic as comparing to that of wired LAN, an acknowledgement (ACK) frame for reception determination should be transmitted at every frame. That is, if a receiving side station (STA) normally receives data, the acknowledgement (ACK) frame is transmitted to the transmitting side station (STA) to advise whether or not the reception state is normal.

However, the time interval used in transmitting the acknowledgement (ACK) frame following data reception is a very short interval, referred to as a short inter-frame space (SIFS). The time interval is the time interval between the frames transmitted, which is referred to as the inter-frame space (IFS), and differentiates a frame interval or a re-transmittance interval, etc. according to priority. The SIFS is used for an immediate response corresponding to an operation of a burst transmission, for example, of the acknowledgement (ACK) frame, a clear-to-send (CTS) frame, or a segmented data frame.

Figure 2:
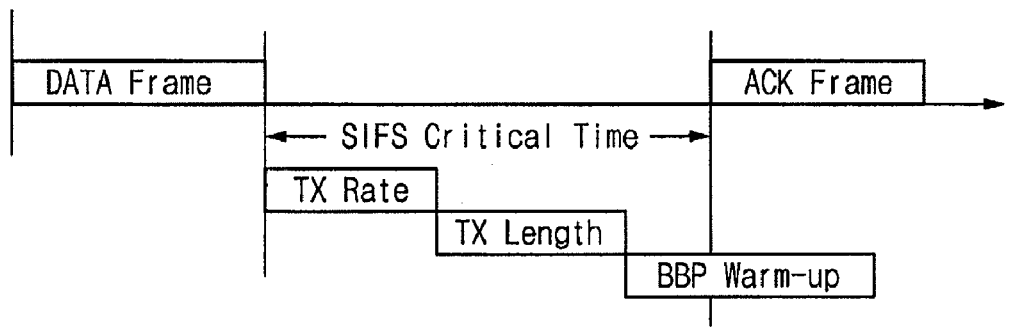
FIG. 2 is a timing diagram illustrating critical timing at the time of data transmission between a media access controller and a baseband processor in a conventional wireless LAN data transmission apparatus.

Accordingly, as shown in FIG. 2, within the short interval of the SIFS, the transmission length data (TX Length) and the transmission rate data (TX Rate) of the transmission data are transmitted. Accordingly, a warm-up operation of the baseband processor is difficult to control, which frequently causes the time span required for the warm-up of the baseband processor (BBP warm-up) to overshoot the critical timing window. Specifically, in the case where the serial peripheral interface (SPI) that is under software control is used to transmit the transmission rate data (TX Rate) and the transmission length data (TX Length) of the transmission data during the SIFS between the data frame (DATA Frame) and the acknowledgement frame (ACK Frame), and in case where the baseband processor is being warmed-up, the critical timing of the SIFS cannot be exactly predicted. This is because the software-based SPI controls each operation in a software-polling manner at the time of data transmitting and receiving operation, and therefore, operation time is not readily predictable, and also a great deal of time is consumed by the software operation. Furthermore, since the SPI is intended, and therefore designed, for low-performance communication, the transmission rate of the SPI itself is relatively low.

Accordingly, the inventive hybrid-type SPI circuit includes two functions, described as follows, in order to address the above-described problems.

First, the control portion of the transmission length data and the transmission rate data of the transmission data is under the control of hardware. That is, a finite state machine is used for control of this function, such that the critical time period can be more readily predicted.

Figure 3:
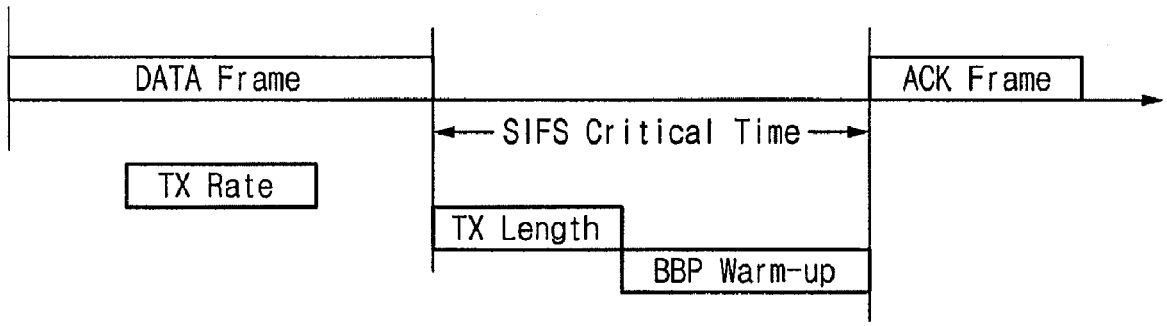
FIG. 3 is a timing diagram for describing a set-ahead function for adjusting critical timing at the time of a data transmission between a media access controller and a baseband processor in a wireless LAN electronic device according to a preferred embodiment of the present invention.

Second, even though the control operation is performed using hardware, since the transmission rate of the SPI itself is relatively slow, transmission of the transmission rate data and the transmission length data of the transmission data following transmission of the data frame results in the inexact adjustment of the critical timing between the frames. Accordingly, as shown in FIG. 3, the transmission rate data and the transmission length data of the transmission data are separated from each other such that the transmission rate data is transmitted prior to the transmission length data (hereinafter, referred to as "set-ahead" function), during transmission of the data frame. At this time, according to the set-ahead function, the transmission rate data of the previously transmitted transmission data utilizes the same transmission rate data as that of the adjacent previously transmitted frame, such that the communication channel is fully utilized.

Figure 4:
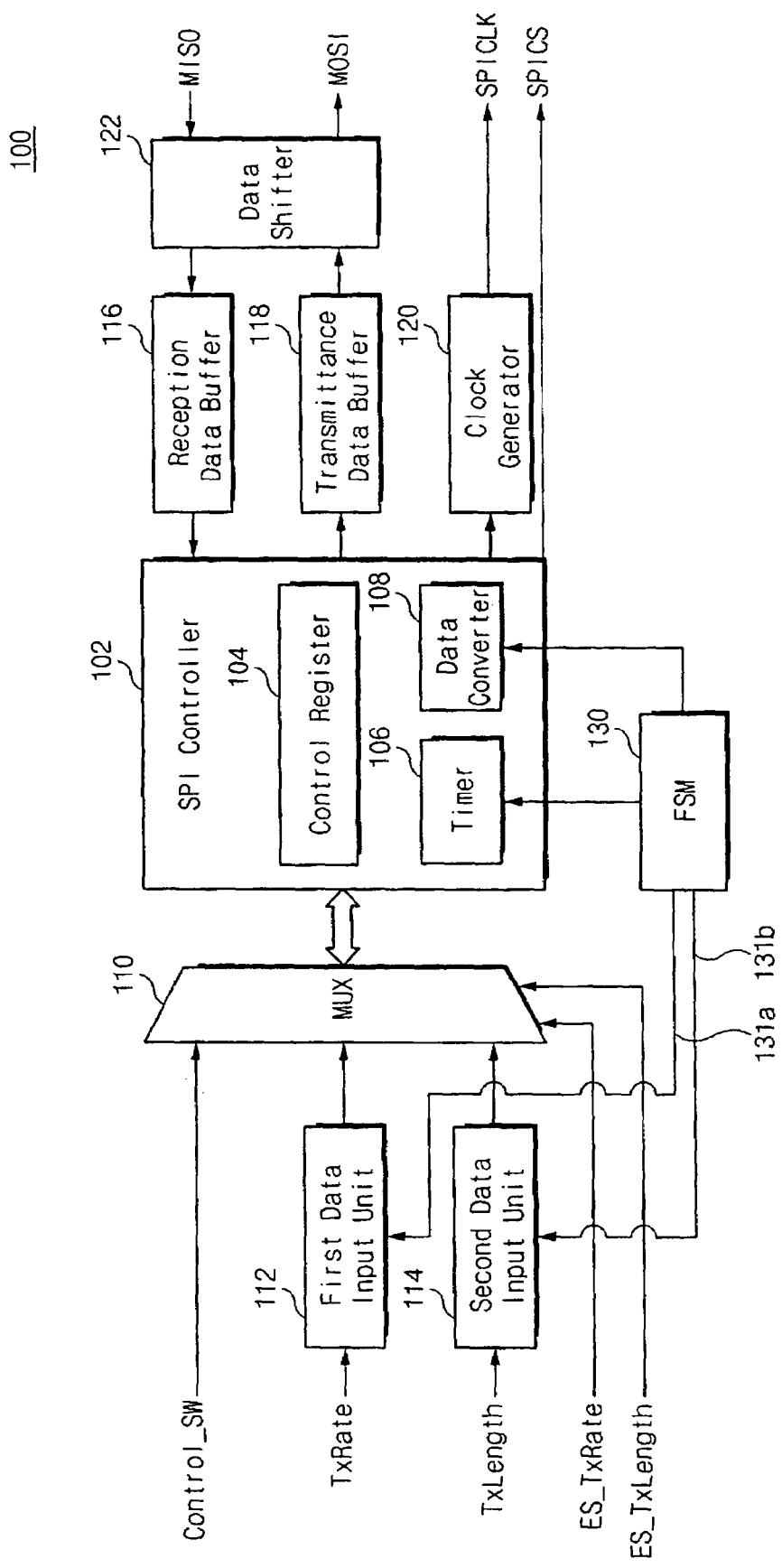
FIG. 4 is a block diagram illustrating detailed construction of the serial peripheral interface circuit of FIG. 1.

In detail, FIG. 4 is a block diagram illustrating the detailed construction of the serial peripheral interface circuit of FIG. 1.

Referring to the drawing, the SPI circuit 100 includes an SPI controller 102 in accordance with the present invention, a finite state machine (FSM) 130, first and second data input units 112 and 114, and a multiplexer 110. Additionally, the SPI circuit 100 includes transmission/reception data buffers 116 and 118, a data shifter 122 and a clock generator 120.

The SPI circuit 100 receives standard input signals and generates standard output signals in accordance with typical software control of the SPI, for example, a software control signal (Control_SW), a SPI clock signal (SPICLK), a master-in-slave-out (MISO), a master-out-slave-in (MOSI) and a SPI chip selection signal (SPICS), etc. For example, in the SPI circuit 100, when data communication is performed between the media access controller 20 being a master and the baseband processor 30 being a slave, the SPI clock signal (SPICLK) operates as an output clock signal in the master mode and operates as an input clock signal in the slave mode.

In addition to the standard signals described above, the SPI circuit 100 further includes, in order to operate in an automatic, hardware-controlled configuration, first and second data signals (TX Rate and TX Length) for transmitting the transmission rate data and the transmission length data of the transmission data from the wireless LAN firmware stored in the external memory 40, and first and second event signals (ES_TX Rate and ES_TX Length) for allowing the first and second data signals (TX Rate and TX Length) to be transmitted to the baseband processor 30.

The first data input unit 112 receives and stores the transmission rate data of the transmission data from the external memory 40, and if the first event signal (ES_TX Rate) for transmitting the transmission rate data (TX Rate) is generated, it is controlled by the finite state machine 130 such that the transmission rate data (TX Rate) is selected by the multiplexer 110.

The second data input unit 114 receives and stores the transmission length data (TX Length) of the transmission data from the external memory 40, and if the second event signal (ES_TX Length) for transmitting the transmission length data (TX Length) is generated, it is controlled by the finite state machine 130 such that the transmission length data (TX Length) is selected by the multiplexer 110.

The multiplexer 110 receives the first and second event signals (ES_TX Rate and EX_TX Length) from the firmware to transmit data adaptive to a corresponding event signal among the first and second data (TX Rate and TX Length) and the software control signal (Control_SW), to the SPI controller 102.

The SPI controller 102 includes a control register 104, a timer 106 and a data converter 108 in its internal section. The control register 102 includes flags for setting values various parameters, including SPI enable, SPI master/slave mode selection, clock polarity, clock phase, clock rate, interrupt enable, transmission termination, and the like. The timer 106 calculates a time for setting a proper delay duration between the frames to be transmitted. Accordingly, in the case where the transmission rate data (TX Rate) and the transmission length data (TX Length) of the transmission data are consecutively transmitted, since between the transmission of the transmission length data (TX Length) and the transmission rate data (TX Rate) of the transmission data, the SPI chip selection signal (SPICS) should be maintained to be in a logic high level for a predetermined time, the timer 106 is used to set the delay duration such that a linked operation with the baseband processor 30 is performed. Additionally, the data converter 108 converts a data quantity into a time unit thereof, for example, converts a byte unit of the transmission length data (TX Length) into a microsecond unit thereof.

The finite state machine 130 is provided for hardware control, and processes the set-ahead function embodied in the present invention. Detailed explanation of the control operation of the finite state machine 130 will be made below with reference to FIG. 5.

The reception data buffer 116 receives data transmitted from the baseband processor 30 through the data shifter 122 for transmission to the SPI controller 102. The transmission data buffer 118 conveys data transmitted by the SPI controller 102 to the data shifter 122. The clock generator 120 is controlled by the SPI controller 102 to generate the SPI clock signal (SPICLK) as a synchronous signal for SPI data transmission. The data shifter 122 receives serial data and shifts data transmitted from the baseband processor 30 for input to the reception data buffer 116, and receives serial data and shifts data transmitted by the transmission data buffer 118 for wireless transmission to the baseband processor 30.

Accordingly, if a data value is written into a control register 104 of the SPI controller 102, the SPI circuit 100 generates the SPI clock signal (SPICLK) from the clock generator 120 to synchronize data transmitted from the MOSI terminal via the data shifter 122, such that the data is transmitted to the baseband processor 30. When an entire byte of data has been shifted through the data shifter, the clock generator 120 stops operation and a transmission termination flag of the control register 104 is set.

Further, the SPI circuit 100 checks, at the time of frame reception, whether the firmware needs to respond to a frame header or not such that if the event signals (ES_TX Rate and $ES_{\_TX}$ Length) are generated, the type of the reception frame is decoded from the received data, in order to perform the set-ahead function. In addition, the firmware determines whether an event is generated according to a user's request such as frame transmission, etc., in order to generate the event signals (ES_TX Rate and ES_TX Length), and in response to this, the SPI circuit 100 performs the control operation depending on a corresponding event signal.

As described above, the inventive hybrid-type SPI circuit 100 operates in two ways, that is, first, under the control of software, and, second, under the control of hardware.

First, while under software control, the hybrid-type SPI circuit of the present invention operates in a manner similar to the conventional SPI circuit. That is, a serial communication control sequence of the SPI circuit 100 under software control activates the SPI chip selection signal (SPICS) to be at a logic low level. The control register 104 of the SPI controller 102 is set accordingly. This activates the SPI chip selection signal (SPICS) to be in the logic low level to determine the slave that performs the serial communication, and the control register 104 is set to determine the various characteristics, including polarity, phase, etc. of the SPI clock signal (SPICS), and the quantity of data to be transmitted and received, and the like.

Next, data to be transmitted is written into the transmission data buffer 118, and the SPI serial communication with the baseband processor 30 is performed through the data shifter 122. If data to be transmitted is written into the transmission data buffer 118, the hybrid-type SPI circuit 100 operates as the master, and a synchronization is made with the SPI clock signal (SPICS) to perform the serial communication with the baseband processor 30 as the slave.

Finally, at the time when the data transmission is completed, the SPI chip selection signal (SPICS) is inactivated to be in the logic high level to complete the transmission. However, since the SPI under software control is unpredictable with respect to operation time for completion of transmission, a hardware interrupt should be used or it should be readily polled to indicate whether transmission has completed, in order to acknowledge completion time.

Further, in the case where the hybrid-type SPI circuit 100 operates under automatic hardware control, the wireless LAN firmware receives the first and/or second event signals (ES_TX Rate and/or ES_TX Length) for instructing the writing of the transmission rate data (TX Rate) and the transmission length data (TX Length) to be transmitted to the baseband processor 30, to perform serial communication with the baseband processor 30.

Additionally, it is determined whether the hybrid-type SPI circuit 100 is currently under software or hardware control such that, in case it operates in the hardware automatic control way, data to be transmitted corresponding to a value set in the internal control register 104 determining the characteristic of the SPI clock signal (SPICLK) and the length of transmitted data, etc. is reconstructed in the form baseband data configured to be transmitted to the baseband processor 30.

Accordingly, if the hybrid-type SPI circuit 100 receives, while in a standby state operating under software control, at least one event signal (ES_TX Rate, ES_TX Length) for transmitting the transmission rate data (TX Rate) or the transmission length data (TX Length) of the transmission data to the baseband processor 30 by the wireless LAN firmware, the SPI circuit then operates under automatic hardware control according to the operation sequence of the finite state machine 130.

As described above, if an operation of the SPI for warming-up the baseband processor in the wireless LAN is at the critical timing, the hybrid type SPI operating under the control of hardware is embodied so that the exact operation time can be predicted, and thus the critical timing is satisfied, such that the critical timing between the frames can be precisely controlled.

Figure 5:
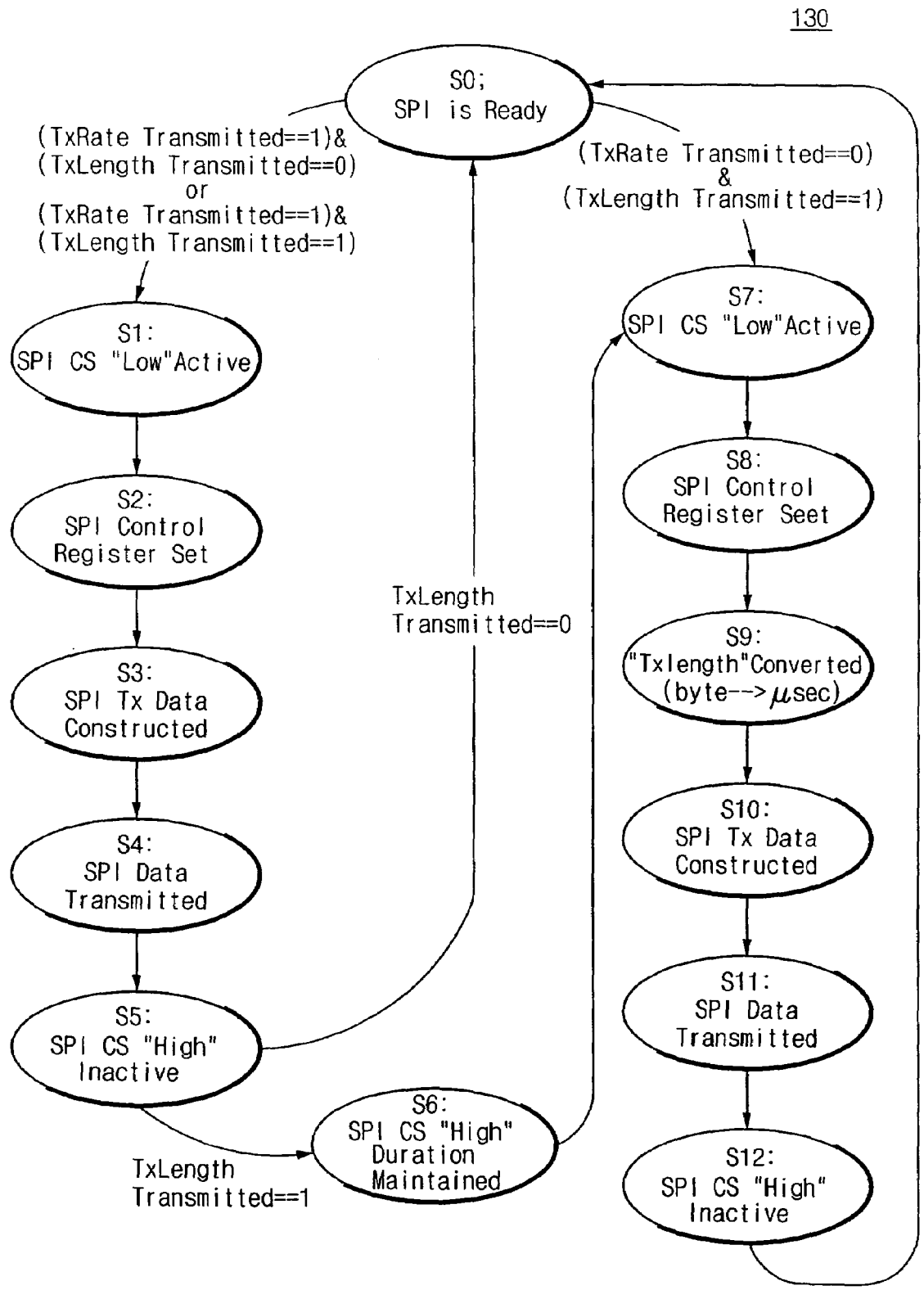
FIG. 5 is a state diagram illustrating hardware control of the finite state machine of FIG. 4.
Figure 6A:
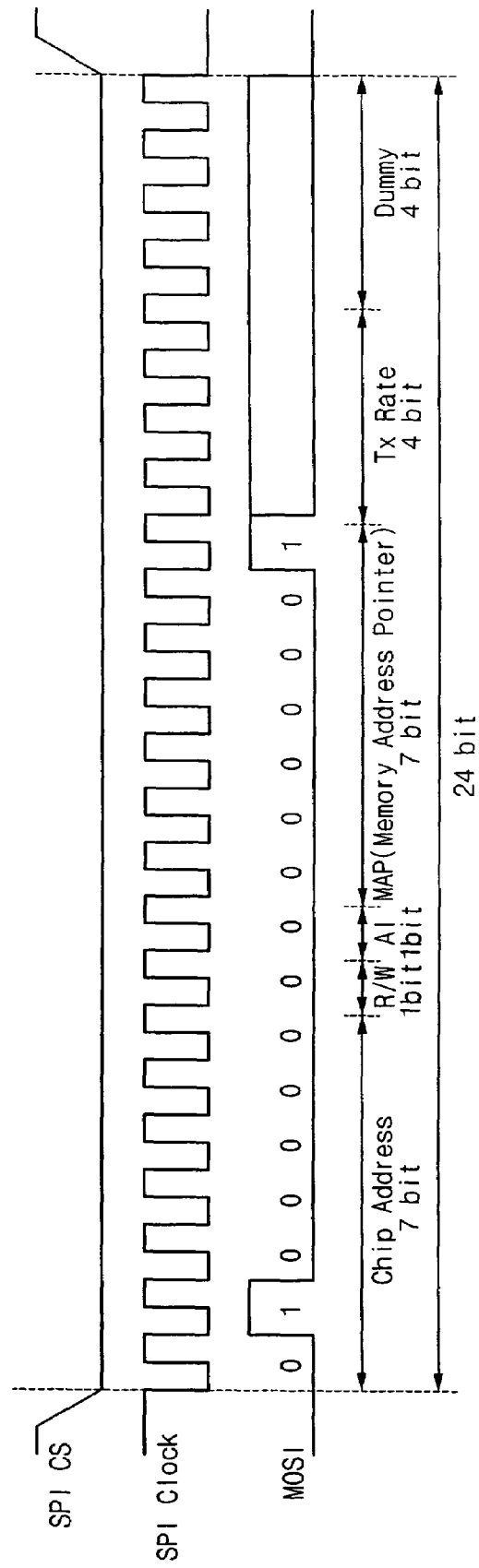
FIG. 6A is a timing diagram for illustrating the transmission of transmission-rate data to a baseband processor from the serial peripheral interface circuit of FIG. 4.
Figure 6B:
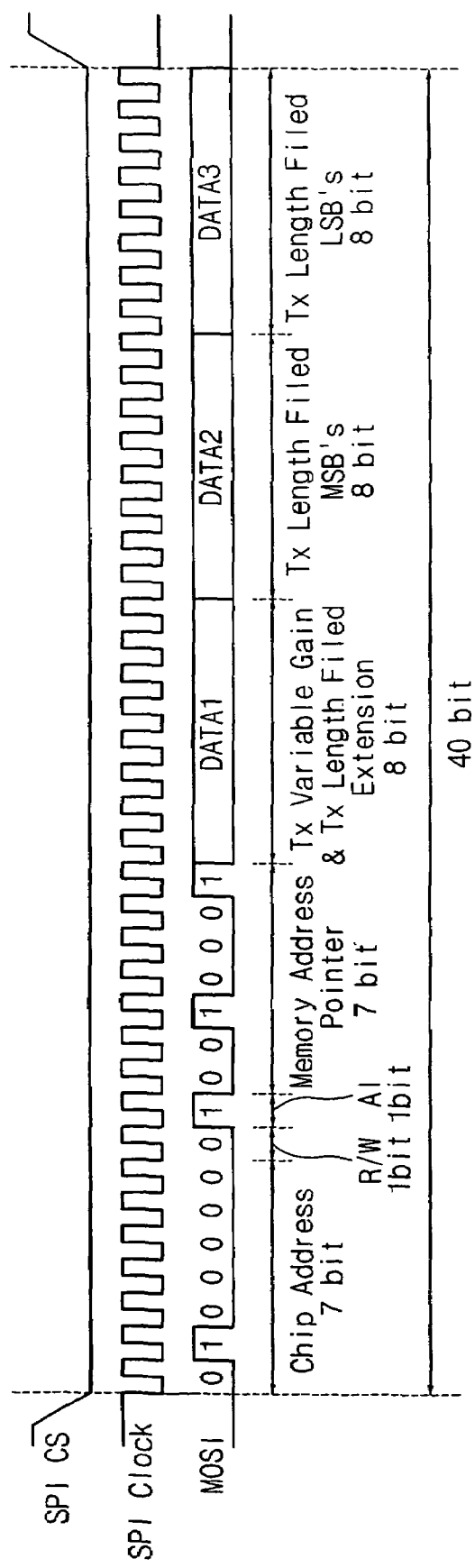
FIG. 6B is a timing diagram for illustrating the transmission of transmission-length data to a baseband processor from the serial peripheral interface circuit of FIG. 4.

FIG. 5 is a state diagram illustrating the process of automatic hardware control under the finite state machine 130 of FIG. 4. FIG. 6A is a timing diagram related to the transmission of transmission rate data to a baseband processor from the SPI circuit of FIG. 4, and FIG. 6B is a timing diagram related to the transmission of transmission length data to the baseband processor from the SPI circuit of FIG. 4.

Referring to FIG. 5, while in a standby state, the finite state machine 130 waits for generation of at least one event signal (ES_TX Rate, ES_TX Length) for transmitting the transmission rate data (TX Rate) and/or the transmission length data (TX Length) of the transmission data. Upon generation of an event signal, the state machine 130 responds by transmitting both, or either, of the transmission rate data (TX Rate) and the transmission length data (TX Length) to the baseband processor 30.

That is, the standby state S0 is state-converted into a state S1 so as to transmit all the transmission length data (TX Length) and the transmission rate data (TX Rate) of the transmission data, or to transmit only transmission rate data (TX Rate).

In the state S1, the SPI chip selection signal (SPICS) is activated (active low) to transmit the transmission rate data (TX Rate) to the baseband processor 30. In a state S2, the value of the control register 104 is set and the state S2 is converted into a state S3. In the state S3, data to be transmitted is reconstructed such that the serial communication can be performed with the baseband processor 30. During this time, a latch signal 131a is generated by the finite state machine 130, and applied to the first data input unit 112, in order to latch the TxRate data presently stored in the unit 112. Also, during this time, the multiplexer selection signals are set by the finite state machine 130, such that the multiplexer 110 selects data from the first data input unit 112.

At this time, the transmission rate data (TX Rate) is, as shown in FIG. 6A, reconstructed according to a serial communication protocol with the baseband processor 30. The transmission rate data (TX Rate) is output as the MOSI signal, and a chip address, a reading/writing bit (R/W), an automatic increment (AI) bit and a memory address pointer (MAP) values, among MOSI construction values, are set to a predetermined values by the SPI, however, they are constructed to enable register programming, so as to increase a flexibility. Additionally, four more significant bits of the transmission rate data (TX Rate) use the value input by the wireless LAN firmware as it is, and four less significant bits are reconstructed in a form of dummy bits constructed by an arbitrary value, in order to adjust the length of data to 8 bits of data, so as not to influence data transmission and reception.

Accordingly, in order to transmit the transmission rate data (TX Rate) to the baseband processor 30, the state machine is advanced to state S5. Referring again to FIG. 5, if the SPI data transmission in state S4 has completed, a state-conversion is made to state S5, in order to inactivate the SPI chip selection signal (SPICS). Next, according to whether the transmission length data (TX Length) of the transmission data is to be transmitted, the state-conversion is made to the state S0 to maintain the standby state, or, alternatively, the state-conversion is made to state S6, in order to maintain the time duration for transmitting the transmission length data (TX Length) of the transmission data.

State S6 is a state in which the transmission rate data (TX Rate) and the transmission length data (TX Length) of the transmission data are to be transmitted consecutively, that is, in which the SPI circuit 100 is needed only when dual serial communications are performed with the baseband processor 30. This is because in the serial communication protocol of the baseband processor 30, the SPI chip selection signal (SPICS) is, during the serial communication, maintained to be in the logic high level for a predetermined time. Accordingly, as shown in FIG. 4, the timer 106 is provided as hardware to count a predetermined time period corresponding with the time duration between the frames, during which period, the SPI chip selection signal (SPICS) is maintained to be at a logic high level.

The finite state machine 130 further advances from state S0 or state S6 to state S7 in order to transmit the transmission length data (TX Length) of the transmission data. In state S7, the SPI chip selection signal (SPICS) is activated to transmit the transmission length data (TX Length) of the transmission data, and the state-conversion is made to a state S8. In state S8, the SPI internal control register 104 is set to a predetermined value. During this time, a latch signal 131b is generated by the finite state machine 130, and applied to the second data input unit 114, in order to latch the TxLength data presently stored in the unit 114. Also, during this time, the multiplexer selection signals are set by the finite state machine 130, such that the multiplexer 110 selects data from the second data input unit 114.

Next, in state S9, the transmission length data (TX Length) of the transmission data is converted from a byte unit of data to a microsecond unit of data. This is because the transmission length data of the transmission data inputted from the wireless LAN firmware is represented using the byte unit, and data for transmitting to the baseband processor 30 is represented using the microsecond unit. Accordingly, the finite state machine 130 allows the transmission length data (TX Length) of the transmission data to be converted from the byte unit to the microsecond unit in the data converter 108.

In state S10, the SPI transmission data is reconstructed so that the baseband processor 30 is acknowledged by the serial communication protocol. The transmission length data (TX Length) of the transmission data reconstructed, as shown in FIG. 6B, the values of the chip address, the writing/reading, the automatic increment, and the memory address pointer among the data construction values are used to program the register, and the transmission length data (TX Length) is reconstructed using data (DATA1-DATA3) obtained by converting the byte unit of the transmission length data of the transmission data input through the wireless LAN firmware into the microsecond unit thereof.

Next, in state S11, the reconstructed SPI data is transmitted. In state S12, the SPI chip selection signal (SPICS) is inactivated, and the state machine operation is returned to the standby state S0.

Accordingly, the finite state machine 130 is used to perform the serial communication between the media access controller 20 and the baseband processor 30 according to a predetermined operation sequence.

As described above, at the time of communication using a serial communication interface in the wireless LAN circumstance, the transmission rate data is previously transmitted during data transmission so that the critical timing can be exactly controlled between the frames.

Further, as described above, the serial data transmission apparatus is provided in a hybrid-type configuration that utilizes both software control and hardware control such that the exact operation time of the serial data transmission apparatus can be predicted when under the operation of hardware control, and such that when the transmission rate data and the transmission length data are transmitted, the transmission rate data is previously transmitted during data frame transmission such that the critical timing can be exactly controlled during a relatively short inter-frame time period. As a result, the serial peripheral interface can be employed to achieve high-performance serial communication in a wireless LAN configuration.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A data transmission apparatus using a serial communication interface device to perform data transmission between a master and a slave, the data transmission apparatus comprising:

a data input unit for receiving at least one of transmission rate data and transmission length data to be selectively transmitted from the master to the slave;

a selection unit for receiving the at least one of the transmission rate data and the transmission length data from the data input unit, and receiving at least one of a corresponding first event signal and a second event signal for instructing the writing of the at least one of the transmission rate data and the transmission length data to be selectively transmitted to the slave;

a controller receiving the at least one of the transmission rate data and the transmission length data from the selection unit and for controlling a serial communication interface used to transmit the at least one of the transmission rate data and the transmission length data to the slave; and a control unit for automatically controlling critical timing of the transmission of the at least one of the transmission rate data and the transmission length data, in response to activation of the corresponding at least one first event signal and second event signal, wherein when the transmission rate data and the transmission length data are transmitted to the slave, the transmission rate data is selectively transmitted via a control path from the master to the slave during a transmission of a data frame via a data path, and the transmission length data is selectively transmitted from the master to the slave during a time interval following the transmission of the data frame.

2. The data transmission apparatus of claim 1 wherein the control unit automatically controls critical timing of the transmission during a time period in which the slave is undergoing a warm-up procedure.

3. The data transmission apparatus of claim 1, wherein the data input unit comprises:
   a first data input unit for receiving the transmission rate data; and
   a second data input unit for receiving the transmission length data,
   wherein the first and second data input units are controlled by the control unit to transmit the at least one transmission rate data and transmission length data to the selection unit in response to the corresponding at least one first and second event signals.

4. The data transmission apparatus of claim 1, wherein the selection unit comprises a multiplexer.

5. The data transmission apparatus of claim 1, wherein the controller comprises:
   a control register having a plurality of flags for setting information for a serial communication interface;
   a timer for, in the case where the transmission rate data and the transmission length data are to be consecutively transmitted, setting a time duration between the transmission rate data and the transmission length data such that a linked operation is made with the slave under control of the control unit; and
   a data converter for converting the transmission length data to slave-compatible transmission length under the control of the control unit.

6. The data transmission apparatus of claim 5, wherein the data converter converts a data quantity to a time unit of data.

7. The data transmission apparatus of claim 1, wherein the first and second event signals are generated by a firmware stored in an external memory.

8. The data transmission apparatus of claim 7, wherein when data is received from the slave, the first and second event signals indicate whether the firmware requires transmission of a response frame for a frame transmitted from a header of the frame, or requires generation of a frame according to a firmware user's request.

9. The data transmission apparatus of claim 1, wherein, in the case where the transmission rate data and the transmission length data are to be consecutively transmitted, the control unit operates to transmit the transmission rate data during transmission of a frame of transmission data.

10. The data transmission apparatus of claim 9, wherein when the transmission rate data is transmitted during transmission of the frame of the transmission data, the control unit operates to set the transmission rate data at the same transmission rate as that of a previously transmitted frame.

11. The data transmission apparatus of claim 1, wherein the control unit is comprised of a finite state machine.

12. The data transmission apparatus of claim 11, wherein the control unit performs a control function comprised of: a first control state in which, if both of the first and second event signals are generated, the transmission rate data and the transmission length data are controlled to be consecutively transmitted to the slave; and second and third control states in which, if one of the first and second event signals is generated, then a corresponding one of the transmission rate data and the transmission length data is controlled to be transmitted to the slave.

13. The data transmission apparatus of claim 12, wherein in the first control state, in the case where the transmission rate data and the transmission length data are consecutively transmitted, a selection signal of the slave is activated for a time duration data such that a linked operation is made with the slave.

14. The data transmission apparatus of claim 12, wherein in the third control state, when the transmission length data is transmitted, the transmission length data is converted from a byte unit to a microsecond unit of data.

15. The data transmission apparatus of claim 1, wherein the control unit includes software for polling for completion of the transmission of frame transmission data for controlling the critical timing.

16. The data transmission apparatus of claim 1, being provided in an electronic device for a wireless LAN.

17. A serial data transmission method for transmitting data from a master to a slave, comprising:
   determining whether a need exists for transmission of at least one of a transmission rate data and a transmission length data for a data frame to be transmitted from the master to the slave;
   generating at least one of a corresponding first event signal and a second event signal to respectively instruct the transmission of the at least one of the transmission rate data and the transmission length data;
   transmitting the transmission rate data to the slave via a control path during the transmission of the data frame via a data path in response to the first event signal;
   converting the transmission length data to a format suitable for the slave; and
   transmitting the converted transmission length data to the slave via the control path during a time period between the data frame and a next data frame, in response to the second event signal subsequent to the transmission rate data being transmitted to the slave during the transmission of the data frame.

18. The method of claim 17 wherein the slave undergoes a warm-up procedure during a time period between the data frame and the next data frame.

19. A data transmission apparatus using a serial communication interface device to perform data transmission between a master and a slave, the data transmission apparatus comprising:
   a data input unit for receiving at least one of transmission rate data and transmission length data to be selectively transmitted from the master to the slave;
   a selection unit for receiving the at least one of the transmission rate data and the transmission length data from the data input unit, and receiving at least one of a corresponding first event signal and a second event signal for instructing the writing of the at least one of the transmission rate data and the transmission length data to be selectively transmitted to the slave;

a controller receiving the at least one of the transmission rate data and the transmission length data from the selection unit and for controlling a serial communication interface used to transmit the at least one of the transmission rate data and the transmission length data to the slave, wherein the controller comprises:
- a control register having a plurality of flags for setting information for a serial communication interface;
- a timer for, in the case where the transmission rate data and the transmission length data are to be consecutively transmitted, setting a time duration between the transmission rate data and the transmission length data such that a linked operation is made with the slave under control of the control unit; and
- a data converter for converting the transmission length data to slave-compatible transmission length under the control of the control unit; and
- a control unit for automatically controlling critical timing of the transmission of the at least one of the transmission rate data and the transmission length data, in response to activation of the corresponding at least one first event signal and second event signal.

20. The data transmission apparatus of claim 19, wherein the data converter converts a data quantity to a time unit of data.

* * * * *